United States Patent
Deng

(10) Patent No.: US 7,680,663 B2
(45) Date of Patent: Mar. 16, 2010

(54) USING A DISCRETIZED, HIGHER ORDER REPRESENTATION OF HIDDEN DYNAMIC VARIABLES FOR SPEECH RECOGNITION

(75) Inventor: Li Deng, Redmond, WA (US)

(73) Assignee: Micrsoft Corporation, Redmond, WA (US)

( * ) Notice: Subject to any disclaimer, the term of this patent is extended or adjusted under 35 U.S.C. 154(b) by 867 days.

(21) Appl. No.: 11/507,169

(22) Filed: Aug. 21, 2006

(65) Prior Publication Data

US 2008/0046245 A1 Feb. 21, 2008

(51) Int. Cl.
*G10L 15/28* (2006.01)
*G10L 15/00* (2006.01)

(52) U.S. Cl. .................. 704/255; 704/231; 704/239
(58) Field of Classification Search .................. None
See application file for complete search history.

(56) References Cited

U.S. PATENT DOCUMENTS

| | | | | |
|---|---|---|---|---|
| 4,980,917 | A * | 12/1990 | Hutchins | 704/254 |
| 5,579,436 | A | 11/1996 | Chou et al. | 704/244 |
| 5,946,656 | A | 8/1999 | Rahim et al. | 704/256.2 |
| 6,076,053 | A | 6/2000 | Juang et al. | 704/236 |
| 6,076,058 | A | 6/2000 | Chengalvarayan | 704/256.8 |
| 6,112,175 | A | 8/2000 | Chengalvarayan | 704/256.5 |
| 6,125,345 | A | 9/2000 | Modi | 704/240 |
| 6,285,980 | B1 | 9/2001 | Gandhi et al. | 704/256 |
| 6,567,776 | B1 | 5/2003 | Chang et al. | 704/236 |
| 6,925,432 | B2 | 8/2005 | Lee et al. | 704/5 |
| 2003/0023438 | A1 | 1/2003 | Schramm et al. | 704/240 |
| 2003/0182110 | A1 * | 9/2003 | Deng | 704/231 |
| 2004/0143435 | A1 * | 7/2004 | Deng et al. | 704/256 |
| 2004/0267530 | A1 | 12/2004 | He et al. | 704/256 |
| 2006/0069678 | A1 | 3/2006 | Chou et al. | 707/5 |

OTHER PUBLICATIONS

Li, et al., "Large margin HMMs for speech recognition" Date: Mar. 2005, pp. 513-516, vol. 5, http://ieeexplore.ieee.org/xpl/freeabs_all.jsp?arnumber+1416353.

Liu, et al., "Discriminative Training of CDHMMS for Maximum Relative Separation Margin" Date: Mar. 2005, pp. 101-104, vol. 1, http://ieeexplore.ieee.org/xpl/freeabs_all.jsp?arnumber+1415060.

McDermott, et al., "Discriminative training for large vocabulary speech recognition using Minimum Classification Error" http://people.csail.mit.edu/hazen/publications/TASLP-McDermott-2006-preprint.pdf.

Wang, et al., "Generalized MCE Training Algorithm for Feature Dimensionality Reduction" Date: 2001, http://citeseer.ist.psu.edu/cache/papers/cs2/598/http:zSzzSzmaxwell.me.qu.edu.auzSzsplzSzpublicationsSzpaperszSzmerc01_wang.pdf/wang01generalized.pdf.

* cited by examiner

*Primary Examiner*—Matthew J Sked
(74) *Attorney, Agent, or Firm*—Joseph R. Kelly; Westman, Champlin & Kelly, P.A.

(57) ABSTRACT

A hidden dynamics value in speech is represented by a higher order, discretized dynamic model, which predicts the discretized dynamic variable that changes over time. Parameters are trained for the model. A decoder algorithm is developed for estimating the underlying phonological speech units in sequence that correspond to the observed speech signal using the higher order, discretized dynamic model.

12 Claims, 6 Drawing Sheets

USING A DISCRETIZED, HIGHER ORDER REPRESENTATION OF HIDDEN DYNAMIC VARIABLES FOR SPEECH RECOGNITION

BACKGROUND

A pattern recognition system, such as a speech recognition system, takes an input signal and attempts to decode the signal to find a pattern represented by the signal. For example, in a speech recognition system, a speech signal is received by the recognition system and is decoded to identify a string of words represented by the speech signal.

Many speech recognition systems utilize Hidden Markov Models in which phonetic units are represented by a single tier of connected states. Using a training signal, probability distributions for occupying the states and for transitioning between states are determined for each of the phonetic units. To decode a speech signal, the signal is divided into frames and each frame is transformed into a feature vector. The feature vectors are then compared to the distributions for the states to identify a most likely sequence of HMM states that can be represented by the frames. The phonetic unit that corresponds to that sequence is then selected.

Although HMM-based recognition systems perform well in many relatively simple speech recognition tasks, they do not model some important dynamic aspects of speech directly (and are known to perform poorly for difficult tasks such as conversational speech). As a result, they are not able to accommodate dynamic articulation differences between the speech signals used for training and the speech signal being decoded. For example, in casual speaking settings, speakers tend to hypo-articulate, or under articulate their speech. This means that the trajectory of the user's speech articulation may not reach its intended target before it is redirected to a next target. Because the training signals are typically formed using a "reading" style of speech in which the speaker provides more fully articulated speech material than in hypo-articulated speech, the hypo-articulated speech does not match the trained HMM states. As a result, the recognizer provides less than ideal recognition results for casual speech.

A similar problem occurs with hyper-articulated speech. In hyper-articulated speech, which often occurs in noisy environments, the speaker exerts an extra effort to make the different sounds of their speech distinguishable. This extra effort can include changing the sounds of certain phonetic units so that they are more distinguishable from similar sounding phonetic units, holding the sounds of certain phonetic units longer, or transitioning between sounds more abruptly so that each sound is perceived as being distinct from its neighbors. Each of these mechanisms makes it more difficult to recognize the speech using an HMM system because each technique results in a set of feature vectors for the speech signal that does not match well to the feature vectors present in the training data.

HMM systems also have trouble dealing with changes in the rate at which people speak. Thus, if someone speaks slower or faster than the training signal, the HMM system will tend to make more errors decoding the speech signal.

Alternatives to HMM systems have been proposed. In particular, it has been proposed that the trajectory or articulatory behavior of the speech signal should be modeled directly. Therefore, one prior system provides a framework for explicitly modeling articulatory behavior of speech. That system identifies an articulatory dynamics value by performing a linear interpolation between a value at a previous time and an articulatory target. The articulatory dynamics value is then used to form a predicted acoustic feature value that is compared with the observed one, and used to determine likelihood that the observed acoustic feature value was produced by a corresponding phonological unit. However, the hidden dynamic variable was represented by a continuously varying variable. This makes parameter training and decoding very difficult. Although another prior system used a discretely varying variable to represent the hidden dynamic variable to reduce such a difficulty, first-order dynamics were explored only.

The discussion above is merely provided for general background information and is not intended to be used as an aid in determining the scope of the claimed subject matter.

SUMMARY

A hidden dynamics value is represented by a higher order, discretized variable, making it more accurate than the first-order system explored in this past. A mathematical model is established to represent the hidden dynamics values that change as a function of time. Parameters are trained for the model and a decoder can be provided for estimating the underlying sequence of phonological units of speech based on an observed speech signal and the mathematical model with the estimated parameters.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Before describing the invention in detail, an overview will be helpful. A model of articulatory dynamics values can be used to generate a predicted speech value, given an observed input. The predicted speech value calculated from the model can be used to perform speech recognition. In particular, a sequence of predicted values can be generated for each of a set of hypothesis phonological sequences. Each sequence of predicted values can then be compared to a sequence of input speech values. The phonological units associated with the sequence of predicted values that best matches the sequence of input speech values is then selected as representing the content of the input speech signal.

In accordance with one embodiment, the comparison performed for speech recognition is achieved using articulatory dynamic vectors that are alternatively and simplistically represented as major vocal tract resonances (VTRs) of low dimensionality. The vocal tract resonances are similar to formants but differ in a number of ways. First, unlike a formant, a VTR is always present in the speech signal, even in unvoiced regions. In addition, VTRs have temporal smoothness between neighboring speech units. The use of VTRs reduces the complexity of utilizing articulatory dynamic variables by reducing the dimensionality of those variables and by taking the variables from being fully hidden to being only partially hidden since VTRs can be identified in the voice regions of speech.

Figure 1:
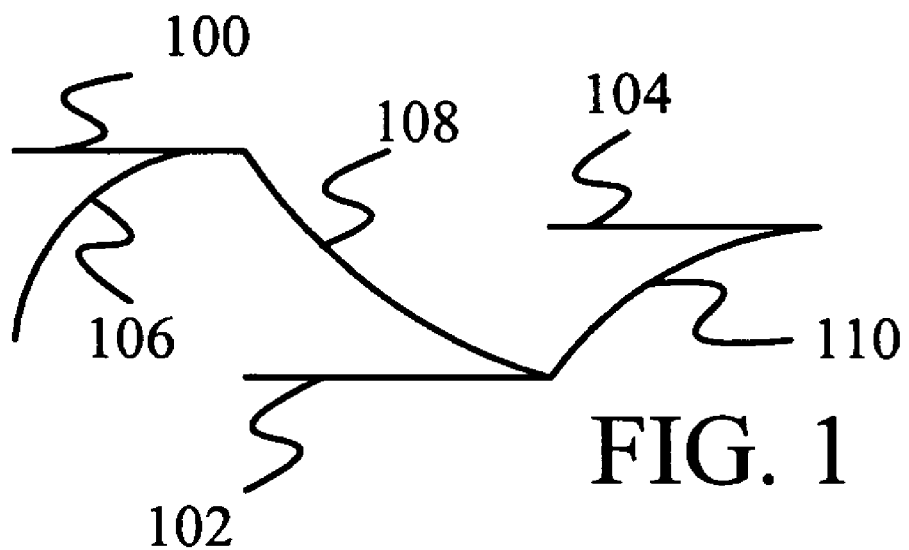
FIGS. 1-5 show articulatory targets and an example articulatory dynamics (trajectories) for the articulation of a same phonological unit under different speaking conditions.

A more concrete discussion of different forms of speech will be helpful. FIG. 1 shows articulatory dynamics values for normal speech. Normal speech may be, by way of example, speech used during reading of text. The articulatory dynamics may be, illustratively, VTRs or another articulatory dynamics variable.

In any case, in the normal speech of FIG. 1, there are three targets 100, 102, and 104, and three trajectories 106, 108, and 110. The targets 100-104 represent the target VTR values that will eventually be reached during normal speech. The trajectories represent how the VTRs reach the target values. Note that trajectories 106, 108, and 110 move toward the targets asymptotically.

Figure 2:
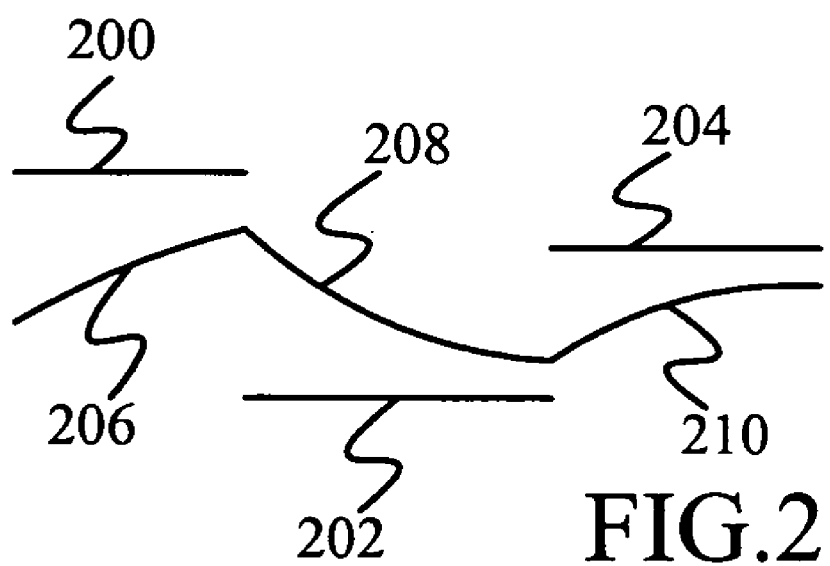

FIG. 2 shows VTRs for hypo-articulated speech, which may be used, for example, during conversational speech. In the hypo-articulated speech of FIG. 2, targets 200, 202, and 204 remain the same as targets 100, 102, and 104, but the trajectories change to trajectories 206, 208 and 210. In particular, during the hypo-articulated speech of FIG. 2, the speaker uses less effort to reach the targets so that trajectories 206, 208, and 210 do not reach their targets before the next trajectory begins. Note that although trajectories 206, 208, and 210 are different from trajectories 106, 108, and 110, the targets remain the same. However, the time constant that defines the trajectories is different in hypo-articulated speech than in normal speech.

Figure 3:
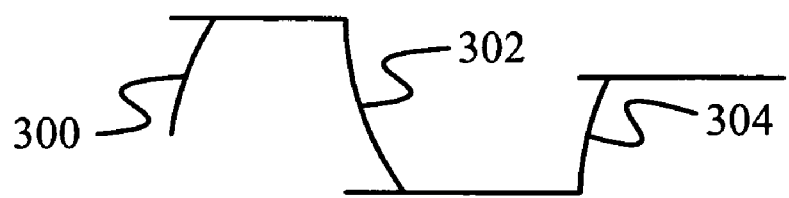

FIG. 3 exemplifies hyper-articulated speech, which may be used, for example, when a speaker is having difficulty using a speech recognizer and begins speaking very distinctly. In the hyper-articulated speech of FIG. 3, the targets again remain the same, but the time constant of the trajectories 300 302, and 304 changes so that the trajectories reach their targets faster. To reach the targets faster, the speaker is using more effort to make the speech clear. In some cases, this effort results in target overshoot (not shown) in which the trajectory passes through the target briefly before moving back toward the target. The changes made during hyper-articulation are often made in response to a noise or distortion in the surrounding environment.

Figure 4:
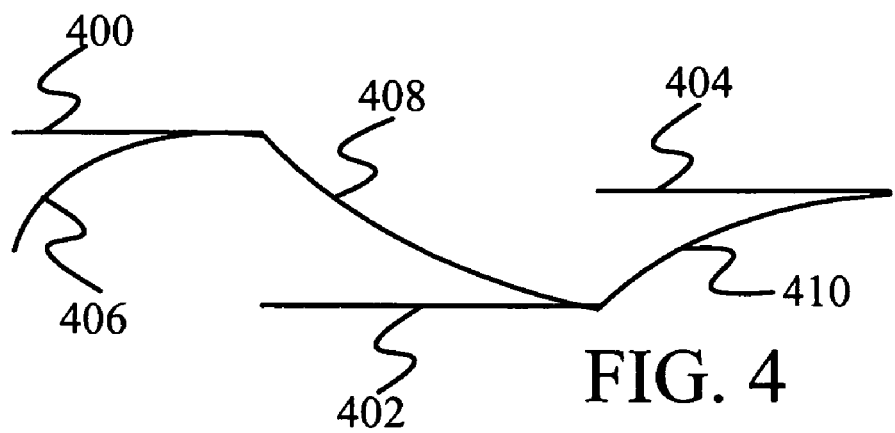

In FIG. 4, the trajectories and targets of slow speech are shown. During slow speech, targets 400, 402, and 404 are at the same level as normal speech targets 100, 102, and 104. However, the targets extend for a longer time reflecting the fact that the speaker is extending each phonological unit. As shown in trajectories 406, 408, and 410, the speaker also changes the time constant during slow speech so that the trajectories approach the targets at a slower rate.

Figure 5:
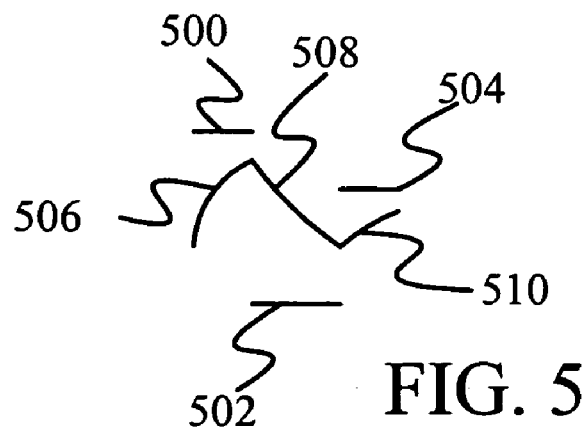

In the fast speech of FIG. 5, the speaker uses targets 500, 502 and 504, which are at the same level as targets 100, 102, and 104 of normal speech but that have a shorter duration. Because of the shorter duration, trajectories 506, 508, and 510 do not have time to reach the targets. However, during the time that the trajectories are moving toward the targets, they have the same time constant as in normal speech.

As shown in FIGS. 1-5, since the targets remain at the same levels in each of these cases, training data containing normal speech, hypo-articulated speech, hyper-articulated speech, slow speech, and fast speech can be used to train the same targets. This improves the accuracy of the targets by providing more data with which to train them. In addition, changes to the time constant that occur during non-normal speech can be modeled using training speech that includes examples of the non-normal speech styles such as hypo-articulated speech, hyper-articulated speech, slow speech, and fast speech. The resulting articulatory dynamics values produced from these trained values will then represent the dynamic articulation that will be present during non-normal speech. As a result, the predicted speech values produced from the articulatory dynamics values will better match the observed speech produced during hypo-articulation, hyper-articulation, slow speech, and fast speech.

In the examples discussed above, hyper-articulated speech was described as producing a change in the time constant without changing the level of the target. Hyper-articulated speech can occur when the user shifts the target level to better distinguish similar sounds. In such cases, training data is collected that includes such target shifts.

With this overview of articulatory dynamics in speech, a number of advantageous models in accordance with illustrative embodiments are now described. In accordance with one embodiment, a special type of hidden dynamic model recursively defines the hidden dynamics, where the hidden dynamic values are discreted. Again, the hidden dynamics are described here in terms of VTRs but other hidden dynamic values could be used as well, such as other dynamic, continuously varying values indicative of other characteristics of articulation.

The discretization or quantization of the hidden dynamics causes an approximation to continuous valued dynamics, but it enables an implementation strategy that can take direct advantage of the forward/backward algorithm and dynamic programming in model parameter learning and decoding.

In accordance with one model, discrete-time, first-order hidden dynamics are provided in state Equation 1 below, and linearized mapping from the hidden dynamic variables to the acoustic observation variables is provided in the observation Equation 2 below. Equation 1 shows the first order hidden dynamic in a scalar form, prior to discretizing the hidden dynamics as follows:

$$x_t = r_s x_{t-1} + (1-r_s)T_s + w_t(s),\qquad\text{Eq. 1}$$

where $x_t$ describes the hidden dynamics (or trajectory);

$r_s$ is a residual value that acts as a relative weight where $0 < r_s < 1$ and the sum of all $r_s$ add to 1;

where $T_s$ is the hidden target value;

where state noise $w_t \sim N(w_k; 0, B_s)$ is assumed to be independent and identical distributions (IID), zero-mean Gaussian with phonological state(s)-dependent precision $B_s$; and where N is the length of the observation data sequence.

The linearized observation equation is given by:

$$o_t = H_s x_t + h_s + v_t,\qquad\text{Eq. 2}$$

where observation noise $v_k \sim N(v_k; 0, D_s)$ is assumed to be IID, zero-mean Gaussian with precision $D_s$.

Equations 1 and 2 can be descretized to represent a basic hidden dynamic model in which the discretized state equation takes a simple first-order recursive form and where the observation equation also takes a simple linear form, and is responsible for mapping from hidden dynamic variables to acoustic observation variables. In accordance with another embodiment, however, this basic model is extended. The state equation of the basic model is extended from first order dynamics to higher order dynamics (such as second order dynamics) so as to improve modeling accuracy. In addition, the observation equation of the basic model is extended from the linear form to a non-linear form of mapping function which maps from the discretized hidden dynamic variables to (non-discretized or continuous valued) acoustic observation variables.

In order to extend the basic model, the first order state equation set out in Eq. 1 can be expanded to a second order state equation such as that set out in Eq. 3 as follows:

$$x_t = 2r_s x_{t-1} - r_s^2 x_{t-2} + (1-r_s)^2 T_s + w_t(s) \qquad \text{Eq. 3}$$

Here, like the first-order state equation, state noise $w_k \sim N(w_k; 0, B_s)$ is assumed to be IID zero-mean Gaussian with state(s)-dependent precision $B_s$. Also, $T_s$ is the target parameter that serves as the "attractor" drawing the time-varying hidden dynamic variable toward it within each phonological unit denoted by s.

It can be verified that this second-order state equation, as for the first-order one, has the desirable properties of target directness and monotonicity. However, the trajectory implied by the second-order recursion is more realistic than that by the first-order one. The new trajectory has critically-damped trajectory shaping, while the first-order trajectory has exponential shaping. Detailed behaviors of the respective trajectories are controlled by the parameter $r_s$ in both cases. The explicit probabilistic form of the state equation of Eq. 3 is as follows:

$$p(x_t | x_{t-1}, x_{t-2}, s_t = s) = N(x_t; 2r_s x_{t-1} - r_s^2 x_{t-2} + (1-r_s)^2 T_s, B_s). \qquad \text{Eq. 4}$$

Note the conditioning event is both $x_{t-1}$, and $x_{t-2}$, instead of just $x_{t-1}$ as in the first-order case. This means that the probability of $x_t$ is conditioned on its value one time period previously, and its value two time periods previously. This has the affect of smoothing and damping the trajectory.

After discretization of the hidden dynamic variables $x_t$, $x_{t-1}$, and $x_{t-2}$, Eq. 4 can be approximated as follows:

$$p(x_t[i] | x_{t-1}[j], x_{t-2}[k], s_t = s) \approx N(x_t[i]; 2r_s x_{t-1}[j] - r_s^2 x_{t-2}[k] + (1-r_s)^2 T_s, B_s). \qquad \text{Eq. 5}$$

A second step in extending the basic model involves changing from the linear form of the observation equation (also shown in Eq. 2 above):

$$o_t = H_s x_t + h_s + v_t \qquad \text{Eq. 6}$$

to a nonlinear form:

$$o_t = F(x_t) + h_s + v_t(s), \qquad \text{Eq. 7}$$

where the output of nonlinear predictive or mapping function $F(x_t)$ is the acoustic measurement that can be computed directly from the speech waveform, $h_s + v_t(s)$ is the prediction residual, where $h_s$ is the state-dependent mean and the observation noise $v_t(s) \sim N(v_t; 0, D_s)$ is an IID, zero-mean Gaussian with precision $D_s$.

The phonological unit or state s in $h_s$ may be further subdivided into several left-to-right sub-unit states. In that case, all the state labels s can be treated as the subphone states, but the subphone states in the state equation can be tied so that the sets of $T_s$, $r_s$, $B_s$ are the same for a given phonological unit. This simplifies the model without having to distinguish the state from the "sub-state" and the same label s is used to denote both.

In one embodiment, the nonlinear function $F(x_t)$ is made phonological unit-dependent to increase the model discriminability. For purposes of the present discussion, however, it is assumed to be independent of phonological units.

Eq. 7 can be rewritten in an explicit probabilistic form as follows:

$$p(o_t | x_t, s_t = s) = N(o_t; F(x_t) + h_s, D_s). \qquad \text{Eq. 8}$$

After discretizing the hidden dynamic variable $x_t$, the observation equation of Eq. 8 is approximated by:

$$p(o_t | x_t[i], s_t = s) \approx N(o_t; F(x_t[i]) + h_s, D_s) \qquad \text{Eq. 9}$$

Combining this with Eq. 5 yields the joint probability model:

$$p(s_1^N, x_1^N, o_1^N) = \prod_{t=1}^{N} \pi_{s_{t-1} s_t} p(x_t | x_{t-1}, x_{t-2}, s_t) \qquad \text{Eq. 10}$$

$$p(o_t | x_t, s_t = s)$$

$$\approx \prod_{t=1}^{N} \pi_{s_{t-1} s_t} N(x[i_t]; 2r_s x[i_{t-1}] - r_s^2 x[i_{t-2}] + (1-r_s)^2 T_s, B_s) \times N(o_t; F(x[i_t]) + h_s, D_s)$$

where $i_t$, $i_{t-1}$, and $i_{t-2}$ denote the discretization indices of the hidden dynamic variables at time frames t, t−1, and t−2, respectively.

Parameter estimation for the extended model in Eq. 10 can be done in a variety of ways, including by using the EM algorithm. One illustrative embodiment of this algorithm is discussed for the sake of example.

The E-step is first described for the extended model. Before discretization, the auxiliary function for the E-step can be simplified into the same form of:

$$Q(r_s, T_s, B_s, h_s, D_s) = Q_x(r_s, T_s, B_s) + Q_o(h_s, D_s) + Const., \qquad \text{Eq. 11}$$

where $$Q_x(r_s, T_s, B_s) = 0.5 \sum_{s=1}^{S} \sum_{t=1}^{N} \sum_{i=1}^{C} \sum_{j=1}^{C} \sum_{k=1}^{C} \xi_t(s, i, j, k) \qquad \text{Eq. 12}$$

$$\left[ \log|B_s| - B_s((x_t[i] - 2r_s x_{t-1}[j] + r_s^2 x_{t-2}[k] - (1-r_s)^2 T_s)^2 \right],$$

and $$Q_o(h_s, D_s) = 0.5 \sum_{s=1}^{S} \sum_{t=1}^{N} \sum_{i=1}^{C} \gamma_t(s, i)[\log|D_s| - D_s(o_t - F(x_t[i]) - h_s)^2]. \qquad \text{Eq. 13}$$

It has been found that large computational saving can be achieved by limiting the summations in Eq. 12 for i, j, k based on the relative smoothness of trajectories in $x_t$. That is, the range of i, j, k can be set such that $|x_t[i] - x_{t-1}[j]| < Th_1$, and $|x_{t-1}[j] - x_{t-2}[k]| < Th_2$. The two thresholds, $Th_1$ and $Th_2$, are now set. This can be done empirically or otherwise.

In the above, $\xi t(s, i, j, k)$ and $\gamma t(s, i)$ were used to denote the frame-level posteriors of $$\xi_t(s, i, j, k) = p(s_t = s, x_t[i], x_{t-1}[j], x_{t-2}[k] | o_{N1}), \qquad \text{Eq. 14, Eq. 15}$$

and $$\gamma_t(s, i) = p(s_t = s, x_t[i] | o_{N1}). \qquad \text{Eq. 16}$$

In order to compute $\xi_t(s, i, j, k)$ and $\gamma_t(s, i)$, the forward and backward probabilities are computed by recursion. The forward recursion $$\alpha_t(s, i) \equiv p(o_1^t, s_t = s, i_t = i) \qquad \text{Eq. 17}$$

is $$\alpha(s_{t+1}, i_{t+1}) = \sum_{s_t=1}^{S} \sum_{i_s=1}^{C} \alpha(s_t, i_t) p(s_{t+1}, i_{t+1}|s_t, i_t, i_{t-1}) \quad \text{Eq. 18}$$

$$p(o_{t+1}|s_{t+1}, i_{t+1}).$$

where $$p(o_{t+1}|s_{t+1} = s, i_{t+1} = i) \quad \text{Eq. 19}$$
$$= N(o_{t+1}; F(x_{t+1}[i]) + h_s, D_s),$$

and $$p(s_{t+1} = s, i_{t+1} = i|s_t = s', i_t = j, i_{t-1} = k) \quad \text{Eq. 20}$$
$$\approx p(s_{t+1} = s|s_t = s')p(i_{t+1} = i|i_t = j, i_{t-1} = k)$$
$$= \pi_{s's} N(x_t[i]; 2r_s x_{t-1}[j] - r_s^2 x_{t-2}[k] + (1 - r_s)^2 T_s, B_s).$$

The backward recursion $$\beta_t(s, i) \equiv p(o_{t+1}^N|s_t = s, i_t = i) \quad \text{Eq. 21}$$

is $$\beta(s_t, i_t) = \sum_{s_{t+1}=1}^{S} \sum_{i_{t+1}=1}^{C} \beta(s_{t+1}, i_{t+1}) p(s_{t+1}, i_{t+1}|s_t, i_t, i_{t-1}) \quad \text{Eq. 22}$$
$$p(o_{t+1}|s_{t+1}, i_{t+1}).$$

Given $\alpha_t(s, i)$ and $\beta(s_t, i_t)$ as computed, the posteriors of $\xi_t(s, i, j, k)$ and $\gamma_t(s, i)$ can be obtained.

Re-estimation for parameter $r_s$ is accomplished in the M-step. To obtain the re-estimation formula for parameter $r_s$, the following partial derivative is set to zero:

$$\frac{\partial Q_x(r_s, T_s, B_s)}{\partial r_s} = -B_s \sum_{t=1}^{N} \sum_{i=1}^{C} \sum_{j=1}^{C} \sum_{k=1}^{C} \xi_t(s, i, j, k) \times \quad \text{Eq. 23}$$
$$[x_t[i] - 2r_s x_{t-1}[j] + r_s^2 x_{t-2}[k] - (1 - r_s)^2 T_s][-x_{t-1}[j] + r_s x_{t-2}[k] + (1 - r_s) T_s]$$
$$= -B_s \sum_{t=1}^{N} \sum_{i=1}^{C} \sum_{j=1}^{C} \sum_{k=1}^{C} \xi_t(s, i, j, k) \times$$
$$[-x_t[i] x_{t-1}[j] + 2r_s x_{t-1}^2[j] - r_s^2 x_{t-1}[j] x_{t-2}[k] + (1 - r_s)^2 x_{t-1}[j] T_s +$$
$$r_s x_t[i] x_{t-2}[k] - 2r_s^2 x_{t-1}[j] x_{t-2}[k] + r_s^3 x_{t-2}^2[k] - r_s(1 - r_s)^2 x_{t-2}[k] T_s +$$
$$x_t[i](1 - r_s) T_s - 2r_s x_{t-1}[j](1 - r_s) T_s + r_s^2 x_{t-2}[k](1 - r_s) T_s (1 - r_s)^3 T_s^2]$$
$$= 0.$$

This can be written in the following form in order to solve for $r_s$ (assuming $T_s$ is fixed from the previous EM iteration):

$$A_3 \hat{r}_s^3 + A_2 \hat{r}_s^2 + A_1 \hat{r}_s + A_0 = 0, \quad \text{Eq. 24}$$

where $$A_3 = \sum_{t=1}^{N} \sum_{i=1}^{C} \sum_{j=1}^{C} \sum_{k=1}^{C} \xi_t(s, i, j, k)\{x_{t-2}^2[k] + T_s x_{t-2}[k] + T_s^2\} \quad \text{Eq. 25}$$

$$A_2 = \sum_{t=1}^{N} \sum_{i=1}^{C} \sum_{j=1}^{C} \sum_{k=1}^{C} \xi_t(s, i, j, k)\{-3x_{t-1}[j] x_{t-2}[k] + \quad \text{Eq. 26}$$
$$3T_s x_{t-1}[j] + 3T_s x_{t-2}[k] - 3T_s^2\}$$

$$A_1 = \sum_{t=1}^{N} \sum_{i=1}^{C} \sum_{j=1}^{C} \sum_{k=1}^{C} \xi_t(s, i, j, k)\{2x_{t-1}^2[j] + x_t[i] x_{t-2}[k] - \quad \text{Eq. 27}$$
$$x_t[i] T_s - 4x_{t-1}[j] T_s - x_{t-2}[k] T_s + 3T_s^2\}$$

$$A_0 = \sum_{t=1}^{N} \sum_{i=1}^{C} \sum_{j=1}^{C} \sum_{k=1}^{C} \xi_t(s, i, j, k)\{-x_t[i] x_{t-1}[j] + \quad \text{Eq. 28}$$
$$x_t[i] T_s + x_{t-1}[j] T_s - T_s^2\}$$

Analytic solutions exist for 3rd-order algebraic equations such as the above. For the three roots found, constraints $1 > r_s > 0$ can be used for selecting the appropriate one.

If there is more than one solution satisfying the constraint, then the one can be selected that gives the largest value for $Q_x$.

Re-estimation for parameter $T_s$ is also accomplished in the M-step.

$T_s$ is optimized by setting the following partial derivative to zero:

$$\frac{\partial Q_x(r_s, T_s, B_s)}{\partial T_s} = -B_s \sum_{t=1}^{N} \sum_{i=1}^{C} \sum_{j=1}^{C} \sum_{k=1}^{C} \xi_t(s, i, j, k)[x_t[i] - \quad \text{Eq. 29}$$
$$\frac{2r_s x_{t-1}[j] + r_s^2 x_{t-2}[k] - (1 - r_s)^2 T_s]}{(1 - r_s)^2}$$
$$= 0.$$

Now fixing $r_s$ from the previous EM iteration, an explicit solution is obtained to the re-estimate of $T_s$:

$$\hat{T}_s = \frac{1}{(1 - r_s)^2} \sum_{t=1}^{N} \sum_{i=1}^{C} \sum_{j=1}^{C} \sum_{k=1}^{C} \xi_t(s, i, j, k)\{x_t[i] - \quad \text{Eq. 30}$$
$$2r_s x_{t-1}[j] + r_s^2 x_{t-2}[k]\}.$$

Re-estimation for parameter $h_s$ is also done in the M-step. The following partial derivative is set to zero:

$$\frac{\partial Q_o(h_s, D_s)}{\partial h_s} = -D_s \sum_{t=1}^{N} \sum_{i=1}^{C} \gamma_t(s, i)\{o_t - F(x_t[i]) - h_s\} = 0. \quad \text{Eq. 31}$$

This gives the re-estimation formula:

$$\hat{h}_s = \frac{\sum_{t=1}^{N}\sum_{i=1}^{C}\gamma_t(s,i)\{o_t - F(x_t[i])\}}{\sum_{t=1}^{N}\sum_{i=1}^{C}\gamma_t(s,i)}. \quad \text{Eq. 32}$$

Re-estimation for Bs and Ds is also done in the M-step by setting $$\frac{\partial Q_x(r_s, T_s, B_s)}{\partial B_s} = 0.5\sum_{t=1}^{N}\sum_{i=1}^{C}\sum_{j=1}^{C}\sum_{k=1}^{C}\xi_t(s,i,j,k)[B_s^{-1} - \quad \text{Eq. 33}$$

$$(x_t[i] - 2r_s x_{t-1}[j] + r_s^2 x_{t-2}[k] -$$

$$(1-r_s)^2 T_s)^2]$$

$$= 0$$

The following re-estimation formula is obtained:

$$\hat{B}_s = \frac{\sum_{t=1}^{N}\sum_{i=1}^{C}\sum_{j=1}^{C}\sum_{k=1}^{C}\xi_t(s,i,j,k)[x_t[i] - 2r_s x_{t-1}[j] + r_s^2 x_{t-2}[k] - (1-r_s)^2 T_s]^2}{\sum_{t=1}^{N}\sum_{i=1}^{C}\sum_{j=1}^{C}\sum_{k=1}^{C}\xi_t(s,i,j,k)}. \quad \text{Eq. 34}$$

Similarly, setting $$\frac{\partial Q_o(H_s, h_s, D_s)}{\partial D_s} = 0.5\sum_{t=1}^{N}\sum_{i=1}^{C}\gamma_t(s,i)[D_s^{-1} - \quad \text{Eq. 35}$$

$$(o_t - H_s x_t[i] - h_s)^2]$$

$$= 0,$$

gives the re-estimate (scalar value) of $$\hat{D}_s = \frac{\sum_{t=1}^{N}\sum_{i=1}^{C}\gamma_t(s,i)[o_t - H_s x_t[i] - h_s]^2}{\sum_{t=1}^{N}\sum_{i=1}^{C}\gamma_t(s,i)}. \quad \text{Eq. 36}$$

After the parameters of the extended model are estimated, such as by using the EM algorithm described above, estimation of discrete phonological states and of the quantized hidden dynamic variables can be carried out jointly. This process is referred to as "decoding". Estimation of the phonological states is the problem of speech recognition, and estimation of the hidden dynamic variables is the problem of tracking hidden dynamics.

Before describing the decoding algorithm, which is aimed to find the best single joint state and quantized hidden dynamic variable sequences $(s_1^N, i_1^N)$ for a given observation sequence $o_1^N$, the following quantity is defined:

$$\delta_t(s,i) = \max_{s_1,s_2,\ldots,s_{t-1},i_1,i_2,\ldots,i_{t-1}} P(o_1^t, s_1^t, i_1^{t-1}, s_t = s, x_t[i]) \quad \text{Eq. 37}$$

$$= \max_{s_1^{t-1},i_1^{t-1}} P(o_1^t, s_1^{t-1}, i_1^{t-1}, s_t = s, i_t = i).$$

Note that each $\delta_t(s,i)$ defined can be associated with a node in a three-dimensional trellis diagram. Each increment of time corresponds to reaching a new stage in dynamic programming (DP). At the final stage t=N, the objective function of δN(s, i) is obtained which is accomplished via all the previous stages of computation for t=N−1. Based on the DP optimality principle, the optimal (joint) partial likelihood at the processing stage of t+1 can be computed using the following DP recursion:

$$\delta_{t+1}(s,i) = \max_{s',i'}\delta_t(s',i')p(s_{t+1}=s, i_{t+1}=i|s_t=s', \quad \text{Eq. 38}$$

$$i_t = i')p(o_{t+1}|s_{t+1}=s, i_{t+1}=i)$$

$$= \max_{s',i',j,k}\delta_t(s',i')\pi_{s',s}N(x_{t+1}[i]; 2r_{s'}x_t[j] -$$

$$r_{s'}^2 x_{t-1}[k] + (1-r_{s'})^2 T_s, B_s) \times$$

$$N(o_{t+1}; F(x_{t+1}[i]) + h_s, D_s)$$

for all states s and for all quantization indices i. Each pair of (s, i) at this processing stage is a hypothesized "precursor" node in the global optimal path. All such nodes except one will be eventually eliminated after the backtracking operation. The essence of DP used here is that only the quantities of $\delta_{t+1}(s,i)$ need to be computed as individual nodes in the trellis, removing the need to keep track of a very large number of partial paths from the initial stage to the current $(t+1)^{th}$ stage, which would be required for the exhaustive search. The optimality is guaranteed, due to the DP optimality principle, with the computation only linearly, rather than geometrically, increasing with the length N of the observation data sequence $o_1^N$.

Figure 6:
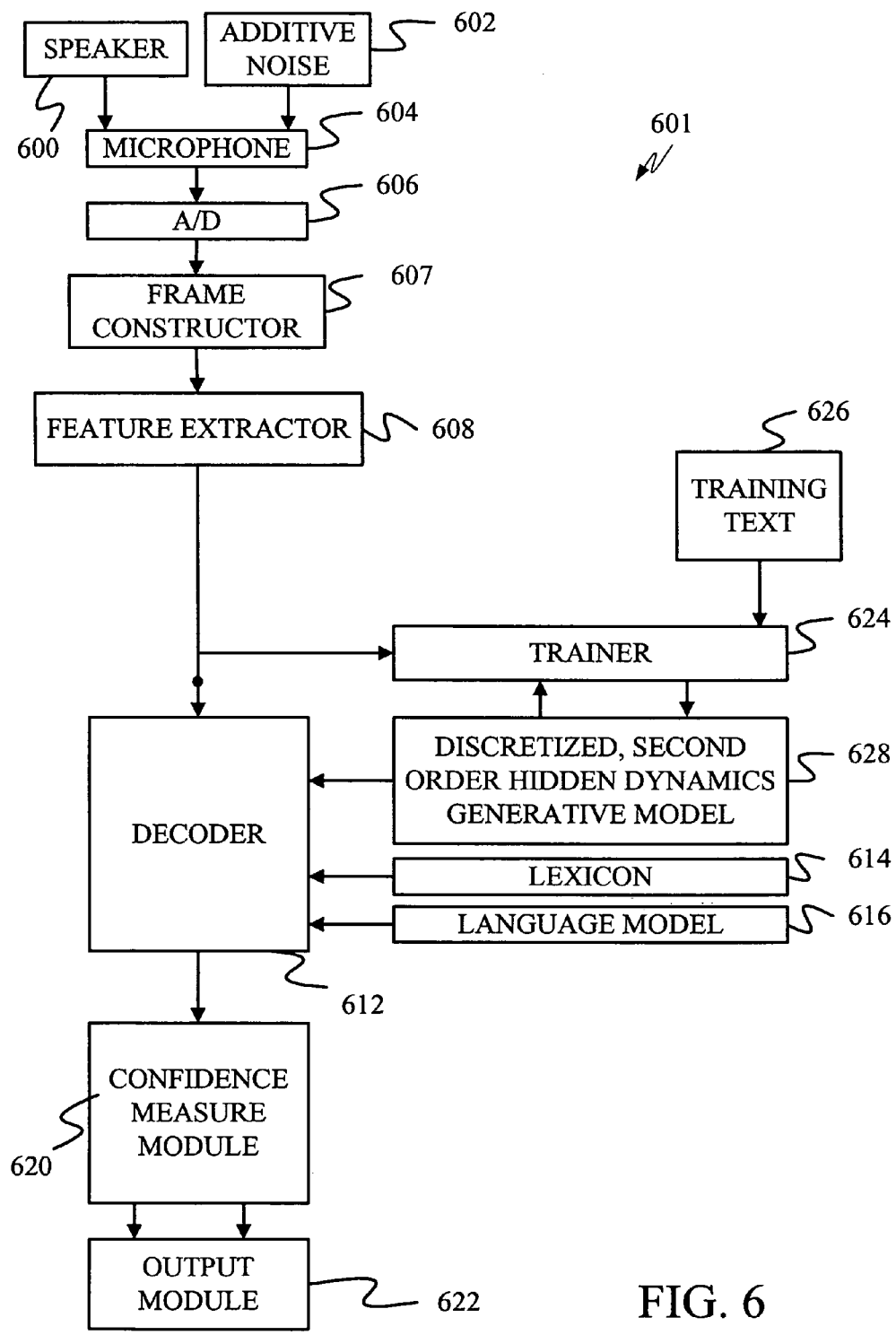
FIG. 6 is a block diagram of one illustrative embodiment of a speech recognition system in which the models of discrete-value hidden speech dynamics can be used.
Figure 7:
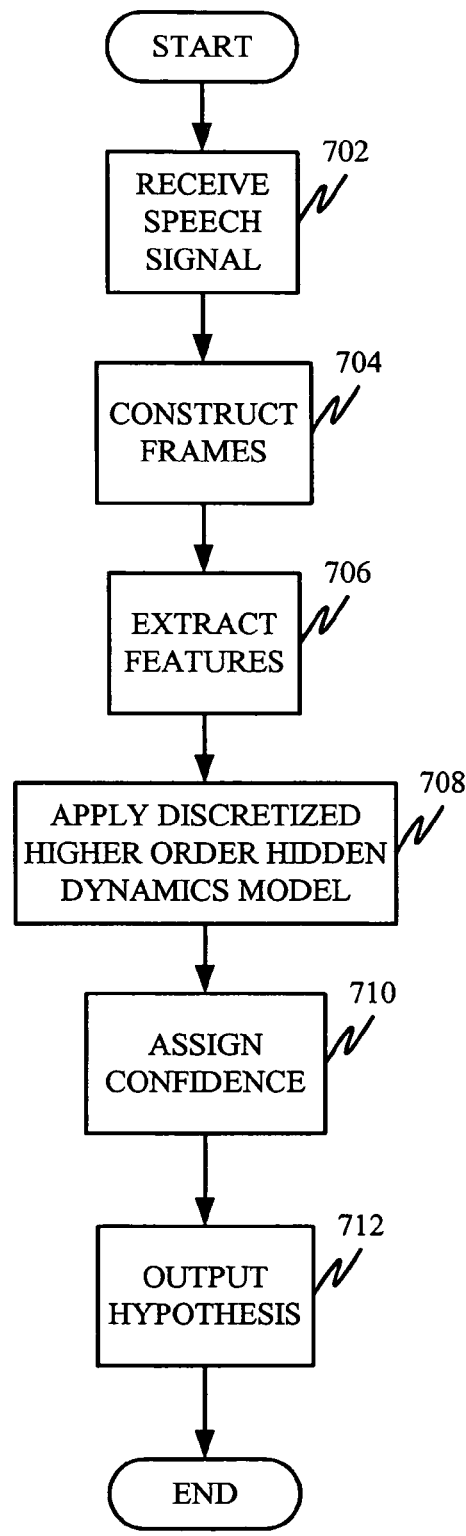
FIG. 7 is a flow diagram showing one illustrative operation of the system shown in FIG. 6.
Figure 8:
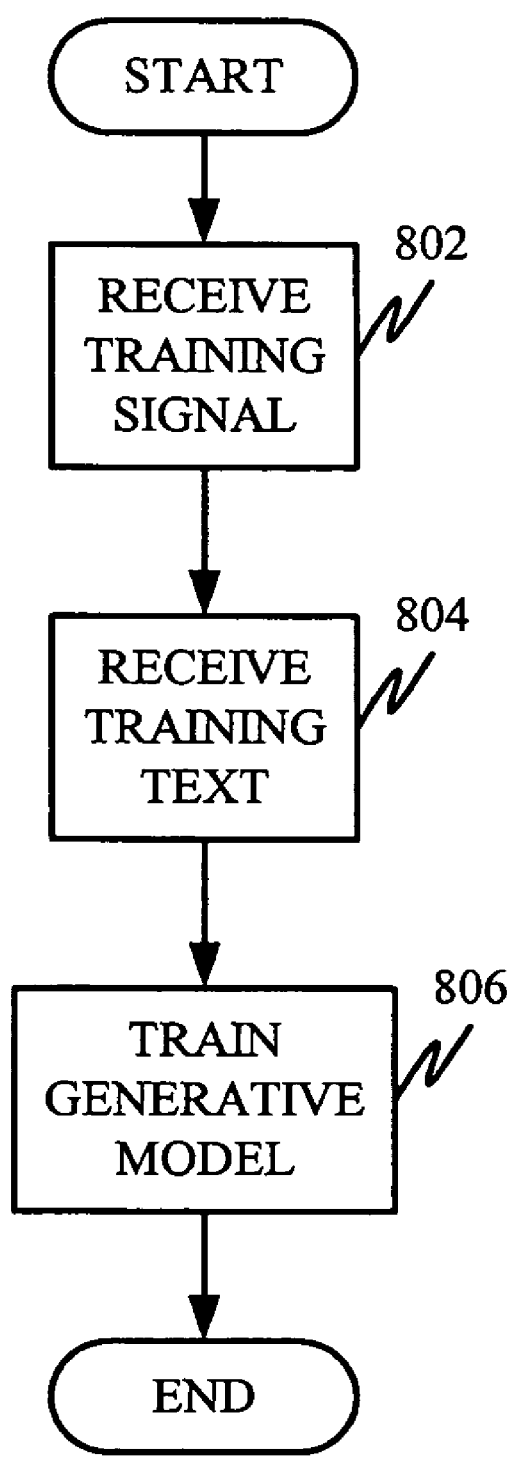
FIG. 8 is a flow diagram of a method of training a generative model in accordance with one embodiment.

FIG. 6 provides a block diagram of a speech recognition system in which the present invention can be used. FIG. 7 is a flow diagram illustrating the operation of the speech recognition system during speech recognition, and FIG. 8 is a flow diagram illustrating the operation of the system during training. In FIG. 6, a speaker 600, either a trainer or a user, speaks into a microphone 604. Microphone 604 also may receive additive noise from one or more noise sources 602. The audio signals detected by microphone 604 are converted into electrical signals that are provided to analog-to-digital converter 606. Receiving the speech signal is indicated by block 702 in FIG. 7.

A-to-D converter 606 converts the analog signal from microphone 604 into a series of digital values. In several embodiments, A-to-D converter 606 samples the analog signal at 16 kHz and 16 bits per sample, thereby creating 32 kilobytes of speech data per second. These digital values are provided to a frame constructor 607, which, in one embodiment, groups the values into 25 millisecond frames that start 10 milliseconds apart. Constructing the frames is indicated by block 704 in FIG. 7.

The frames of data created by frame constructor 607 are provided to feature extractor 608, which extracts a feature from each frame. Examples of feature extraction modules include modules for performing Linear Predictive Coding (LPC), LPC derived cepstrum, Perceptive Linear Prediction (PLP), Auditory model feature extraction, and Mel-Frequency Cepstrum Coefficients (MFCC) feature extraction. Note that the invention is not limited to these feature extraction modules and that other modules may be used within the context of the present invention. Feature extraction is indicated by block 706 in FIG. 7.

If the input signal is a training signal, this series of feature vectors is provided to a trainer 624, which uses the feature vectors and a training text 626 to train the generative model 628 of the present invention. For example, the EM training algorithm described above may be used by trainer 624 to train the generative model. Receiving a training signal and training text is indicated by blocks 802 and 804 in FIG. 8, and training model 628 is indicated by block 806.

If the input signal is a speech signal to be recognized (or test signal), the feature vectors are provided to a decoder 612, which identifies a most likely sequence of words based on the stream of feature vectors, a lexicon 614, a language model 616, and the generative model 628.

Thus, the decoder applies the discretized, second order hidden dynamics model discussed above as shown in Eq. 38. The generative model 628 can be used by the decoder 612 in conjunction with lexicon 614 and language model 616 to identify one or more probable sequences of hypothesis words. This is indicated by block 708 in FIG. 7.

The most probable sequence of hypothesis words is provided to a confidence measure module 620. Confidence measure module 620 identifies which words are most likely to have been improperly identified by the speech recognizer, based in part on a secondary acoustic model (not shown). This is indicated by block 710. Confidence measure module 620 then provides the sequence of hypothesis words to an output module 622 along with identifiers indicating which words may have been improperly identified. This is indicated by block 712. Those skilled in the art will recognize that confidence measure module 620 is not necessary for the practice of the present invention.

Figure 9:
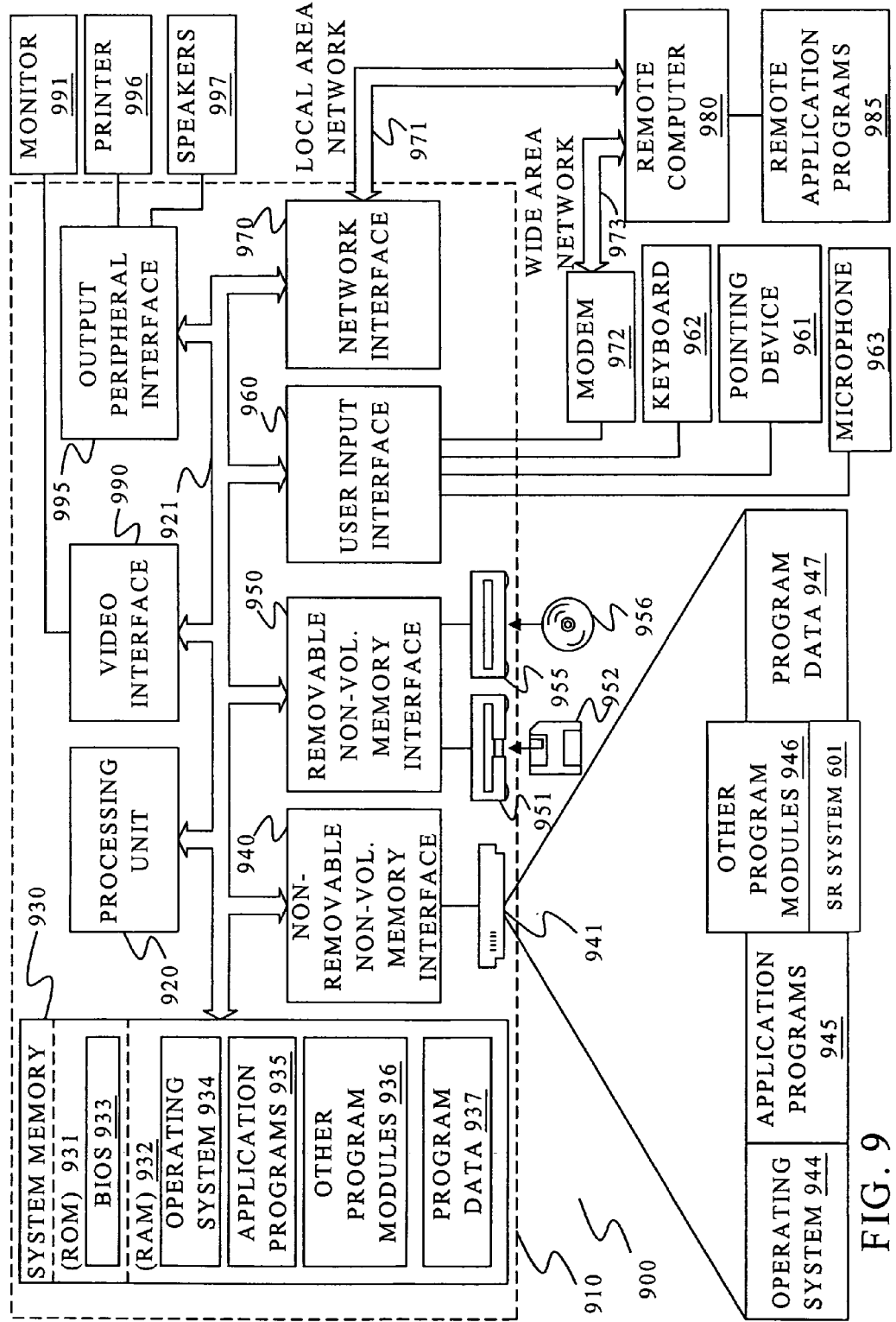
FIG. 9 is a block diagram of one illustrative computing environment.

FIG. 9 illustrates an example of a suitable computing system environment 900 on which embodiments may be implemented. The computing system environment 900 is only one example of a suitable computing environment and is not intended to suggest any limitation as to the scope of use or functionality of the claimed subject matter. Neither should the computing environment 900 be interpreted as having any dependency or requirement relating to any one or combination of components illustrated in the exemplary operating environment 900.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 9, an exemplary system for implementing some embodiments includes a general-purpose computing device in the form of a computer 910. Components of computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 910. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 136, and program data 937.

The computer 910 may also include other removable/non-removable volatile/nonvolatile computer storage media. By way of example only, FIG. 9 illustrates a hard disk drive 941 that reads from or writes to non-removable, nonvolatile magnetic media, a magnetic disk drive 951 that reads from or writes to a removable, nonvolatile magnetic disk 952, and an optical disk drive 155 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media discussed above and illustrated in FIG. 9, provide storage of computer readable instructions, data structures, program modules and other data for the computer 910. In FIG. 9, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies.

In one embodiment, speech recognition system 601 and the training component 624 are located in program modules 946. They could be located in other places, of course, and they could be accessible over the networks shown in FIG. 9.

A user may enter commands and information into the computer 910 through input devices such as a keyboard 962, a microphone 963, and a pointing device 961, such as a mouse, trackball or touch pad. Other input devices (not shown) may include a joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A monitor 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 is operated in a networked environment using logical connections to one or more remote computers, such as a remote computer 980. The remote computer 980 may be a personal computer, a hand-held device, a server, a router, a network PC, a peer device or other common network node, and typically includes many or all of the elements described above relative to the computer 910. The logical connections depicted in FIG. 9 include a local area network (LAN) 971 and a wide area network (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in the remote memory storage device. By way of example, and not limitation, FIG. 9 illustrates remote application programs 985 as residing on remote computer 980. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of recognizing speech, comprising:
   training parameters of a generative model based on speech training data indicative of indexed articulatory dynamic values calculated from the speech in the training data having different types of articulatory dynamics, the articulatory dynamic values being of at least second order and being represented by a distribution and the parameters of the generative model including a precision parameter trained based on a precision of the distribution of the articulatory dynamic;
   receiving an observable acoustic value that describes a portion of a speech signal for a current time period under consideration;
   identifying a predicted acoustic value for a hypothesized phonological unit, using the generative model, based on the indexed articulatory dynamics values and depending on indexed articulatory dynamics values calculated for at least two previous time periods; and
   comparing the observed value to the predicted value to determine a likelihood of the hypothesized phonological unit.

2. The method of claim 1 wherein the indexed articulatory dynamics value comprises a vocal tract resonance (VTR) value.

3. The method of claim 1 wherein identifying a predicted acoustic value comprises:
   extracting a feature vector from the observed acoustic value; and
   applying the generative model, that represents articulatory dynamics hidden in a speech signal, to the feature vector.

4. The method of claim 3 and further comprising:
   prior to extracting a feature vector, constructing frames from the observed acoustic value, the frames being constructed for individual time periods.

5. The method of claim 4 and further comprising:
   outputting a selected phonological unit based on a likelihood of the hypothesized phonological unit.

6. A method of training a model for use in recognizing speech described by an observable input value, comprising:
   receiving observable training data indicative of a plurality of different types of speech; and
   training model parameters for an articulatory dynamics model that represents articulatory dynamics of speech that vary continuously over time and are represented by discrete values calculated from the observable training data for time periods, the model parameters being trained based on the discrete values of the articulatory dynamics calculated for at least two previous time periods;
   wherein training model parameters comprises:
     training the model parameters using expectation-maximization in which values of each parameter are first estimated using forward-backward recursion based on estimations of the articulatory dynamics from at least two previous time periods by re-estimating the model parameters based on a current estimation of the model parameters and estimates of the model parameters from at least two previous time periods; and training a precision parameter indicative of a precision of the value of the articulatory dynamics calculated.

7. The method of claim 6 wherein training model parameters comprises:

training a residual value that compensates for inaccuracy or bias of a predicted value of an acoustic feature vector derived from an acoustic value that describes a portion of a speech signal.

8. The method of claim 6 wherein training model parameters comprises:

training a hidden target value indicative of a value of the articulatory dynamics targeted by the training data.

9. The method of claim 6 wherein the articulatory dynamic is represented as a distribution and wherein training model parameters comprises:

training a mean of the distribution.

10. The method of claim 6 wherein the articulatory dynamic is represented as a distribution and wherein training model parameters comprises:

training a precision of the distribution of the articulatory dynamic.

11. A speech recognition system comprising:

a generative model modeling articulatory dynamics hidden in an observed speech signal that extends over multiple time periods and mapping the articulatory dynamics to a measurable characteristic of the observed speech signal, the generative model modeling the articulatory dynamics based on discrete values of the articulatory dynamics estimated for at least two previous time periods;

a decoder, coupled to the generative model, receiving an observed value describing at least a portion of the observed speech signal and selecting one or more hypothesized phonological units based on the measurable characteristic output by the generative model, corresponding to the observed value, and based on the observed value; and a training component training parameters of the generative model based on training data indicative of speech having different types of articulatory dynamics, wherein the training component trains the parameters of the generative model based on indexed articulatory dynamic values calculated from the training data and being of at least a second order, and the training component training one of the parameters of the generative model as a precision parameter indicative of a precision of the value of the articulatory dynamics calculated.

12. The speech recognition system of claim 11 wherein the decoder is configured to select the one or more hypothesized phonological units by identifying a sequence of articulatory dynamics and a corresponding sequence of measurable characteristics using the generative model and selecting a sequence of hypothesized phonological units based on the sequence of measurable characteristics identified.

* * * * *